US010794296B2

(12) United States Patent
Akiyama et al.

(10) Patent No.: US 10,794,296 B2
(45) Date of Patent: Oct. 6, 2020

(54) GAS TURBINE COMBUSTOR AND METHOD OF OPERATING THE SAME

(71) Applicant: Mitsubishi Hitachi Power Systems, Ltd., Yokohama (JP)

(72) Inventors: Yasuhiro Akiyama, Yokohama (JP);
Mitsuhiro Karishuku, Yokohama (JP);
Keita Naito, Yokohama (JP);
Kanetsugu Nakamura, Yokohama (JP);
Satoshi Dodo, Yokohama (JP);
Tomohiro Asai, Yokohama (JP);
Yoshitaka Hirata, Yokohama (JP);
Akinori Hayashi, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 312 days.

(21) Appl. No.: 15/790,723

(22) Filed: Oct. 23, 2017

(65) Prior Publication Data

US 2018/0112604 A1    Apr. 26, 2018

(30) Foreign Application Priority Data

Oct. 24, 2016  (JP) ................................ 2016-207772

(51) Int. Cl.
*F02C 9/40* (2006.01)
*F23R 3/46* (2006.01)
(Continued)

(52) U.S. Cl.
CPC .................. *F02C 9/40* (2013.01); *F02C 3/22* (2013.01); *F02C 3/24* (2013.01); *F02C 3/30* (2013.01);
(Continued)

(58) Field of Classification Search
CPC .. F23R 3/343; F23R 3/346; F23R 3/36; F23R 3/46; F23R 3/34; F23R 3/283;
(Continued)

(56) References Cited

U.S. PATENT DOCUMENTS 4,589,260 A * 5/1986 Krockow .............. F23D 11/005
60/737
4,683,715 A * 8/1987 Iizuka ....................... F02C 7/26
60/39.41
(Continued)

FOREIGN PATENT DOCUMENTS

CN  102482997 A   5/2012
CN  102741614 A  10/2012
(Continued)

OTHER PUBLICATIONS

Korean-language Office Action issued in counterpart Korean Application No. 10-2017-0136223 dated Jan. 21, 2019 with English translation (10 pages).
(Continued)

*Primary Examiner* — Alain Chau
(74) *Attorney, Agent, or Firm* — Crowell & Moring LLP (57) ABSTRACT

The gas turbine combustor and the operation method thereof are designed to minimize visualization of exhaust gas from the gas turbine upon switching of the gas turbine fuel from the oil fuel to the gas fuel. Upon switching of the combustion by the pilot burner from the oil burning to the gas burning, the gas fuel is supplied to the main burners so as to start the gas burning. Then the gas fuel is supplied to the pilot burner to start the gas burning.

4 Claims, 6 Drawing Sheets

(51) Int. Cl.

| | |
|---|---|
| *F23D 17/00* | (2006.01) |
| *F02C 3/30* | (2006.01) |
| *F02C 3/22* | (2006.01) |
| *F02C 3/24* | (2006.01) |
| *F02C 7/232* | (2006.01) |
| *F02C 7/264* | (2006.01) |
| *F23R 3/28* | (2006.01) |
| *F23R 3/34* | (2006.01) |
| *F23R 3/36* | (2006.01) |

(52) U.S. Cl.
CPC .............. *F02C 7/232* (2013.01); *F02C 7/264* (2013.01); *F23D 17/002* (2013.01); *F23R 3/283* (2013.01); *F23R 3/46* (2013.01); *F23D 2204/10* (2013.01); *F23D 2209/30* (2013.01); *F23D 2900/00014* (2013.01); *F23R 3/286* (2013.01); *F23R 3/343* (2013.01); *F23R 3/36* (2013.01); *F23R 2900/00002* (2013.01); *Y02E 20/16* (2013.01); *Y02E 20/18* (2013.01)

(58) Field of Classification Search
CPC ............ F23R 3/286; F23R 2900/00002; F23R 2900/03343; F02C 9/40; F02C 3/30; F02C 3/22; F02C 3/24; F02C 7/232; F02C 7/264; F02C 7/228; F23D 2209/30; F23D 2204/10; F23D 17/002; F23D 2900/00014
See application file for complete search history.

(56) References Cited

U.S. PATENT DOCUMENTS

| | | | | |
|---|---|---|---|---|
| 6,256,975 B1* | 7/2001 | Dobbeling | ............ | B64D 37/26 60/39.094 |
| 6,862,888 B2* | 3/2005 | Akagi | ............ | F23D 14/78 60/39.463 |
| 7,143,583 B2* | 12/2006 | Hayashi | ............ | F23R 3/18 60/776 |
| 7,581,379 B2* | 9/2009 | Yoshida | ............ | F01D 15/10 60/39.463 |
| 7,770,400 B2* | 8/2010 | Iasillo | ............ | F02C 7/22 60/39.281 |
| 7,934,380 B2* | 5/2011 | Innes | ............ | F02C 7/22 60/737 |
| 8,028,529 B2* | 10/2011 | Venkataraman | ............ | F23R 3/06 165/169 |
| 8,033,821 B2* | 10/2011 | Eroglu | ............ | F23C 7/002 431/12 |
| 9,163,560 B2* | 10/2015 | Meeuwissen | ............ | F02C 3/22 |
| 9,347,377 B2* | 5/2016 | Murakami | ............ | F01D 25/12 |
| 9,447,730 B2* | 9/2016 | Ochiai | ............ | F02C 7/00 |
| 9,459,008 B2* | 10/2016 | Skipper | ............ | F02C 9/28 |
| 9,464,574 B2* | 10/2016 | Deuker | ............ | F01D 19/00 |
| 2001/0027637 A1* | 10/2001 | Norster | ............ | F23C 7/002 60/773 |
| 2003/0024249 A1* | 2/2003 | Akagi | ............ | F23D 14/78 60/740 |
| 2004/0035114 A1* | 2/2004 | Hayashi | ............ | F23R 3/18 60/737 |
| 2007/0003897 A1* | 1/2007 | Koizumi | ............ | F23R 3/28 431/354 |
| 2008/0098994 A1* | 5/2008 | Innes | ............ | F02C 7/22 123/525 |
| 2009/0019855 A1* | 1/2009 | Venkataraman | ............ | F23R 3/06 60/738 |
| 2009/0173057 A1* | 7/2009 | Yoshida | ............ | F01D 15/10 60/39.281 |
| 2010/0050652 A1* | 3/2010 | Skipper | ............ | F02C 9/28 60/772 |
| 2010/0273117 A1* | 10/2010 | Eroglu | ............ | F23C 7/002 431/9 |
| 2011/0185703 A1* | 8/2011 | Dodo | ............ | F23R 3/34 60/39.461 |
| 2011/0239619 A1 | 10/2011 | Omae et al. | | |
| 2012/0047907 A1* | 3/2012 | Zajadatz | ............ | F23K 5/10 60/773 |
| 2012/0180490 A1 | 7/2012 | Takami et al. | | |
| 2012/0247116 A1* | 10/2012 | Meeuwissen | ............ | F02C 3/22 60/772 |
| 2013/0029277 A1* | 1/2013 | Koizumi | ............ | F23R 3/10 431/354 |
| 2013/0091824 A1* | 4/2013 | Murakami | ............ | F01D 25/12 60/39.094 |
| 2013/0291547 A1* | 11/2013 | Ochiai | ............ | F02C 7/00 60/772 |
| 2013/0340438 A1* | 12/2013 | Abreu | ............ | F02C 7/222 60/772 |
| 2014/0000274 A1* | 1/2014 | Srinivasan | ............ | F02C 3/22 60/776 |
| 2014/0190177 A1* | 7/2014 | Deuker | ............ | F02C 3/26 60/776 |
| 2015/0059353 A1 | 3/2015 | Asai et al. | | |
| 2016/0040883 A1 | 2/2016 | Asai et al. | | |
| 2017/0138268 A1* | 5/2017 | Nakahara | ............ | F02C 7/22 |
| 2017/0284671 A1* | 10/2017 | Asai | ............ | F23R 3/283 |

FOREIGN PATENT DOCUMENTS

| | | |
|---|---|---|
| CN | 104421003 A | 3/2015 |
| CN | 104791845 A | 7/2015 |
| CN | 105318353 A | 2/2016 |
| EP | 2 299 091 A1 | 3/2011 |
| EP | 2 982 907 A1 | 2/2016 |
| JP | 4-86335 A | 3/1992 |
| JP | 11-210492 A | 8/1999 |
| JP | 11-210494 A | 8/1999 |
| JP | 2010-65579 A | 3/2010 |
| JP | 2010-133339 A | 6/2010 |
| JP | 2014-105601 A | 6/2014 |
| JP | 2016-38108 A | 3/2016 |
| WO | WO 2016/056180 A1 | 4/2016 |

OTHER PUBLICATIONS

Extended European Search Report issued in counterpart European Patent Application No. 17198057.6 dated Feb. 28, 2018 (Seven (7) pages).
Chinese-language Office Action issued in counterpart Chinese Application No. 201711060611.5 dated Jun. 25, 2019 (six pages).
Indian-language Office Action issued in counterpart Indian Application No. 201714037203 dated Aug. 26, 2019 with English translation (six (6) pages).
Japanese-language Office Action issued in Japanese Application No. 2016-207772 dated Mar. 31, 2020 with English translation (eight (8) pages).

* cited by examiner

GAS TURBINE COMBUSTOR AND METHOD OF OPERATING THE SAME

CLAIM OF PRIORITY

The present application claims priority from Japanese Patent application serial no. 2016-207772, filed on Oct. 24, 2016, the content of which is hereby incorporated by reference into this application.

FIELD OF THE INVENTION

The present invention relates to a gas turbine combustor and a method of operating the gas turbine combustor. More particularly, the present invention relates to the gas turbine combustor and the method of operating the gas turbine combustor, which allow combustion of both gas fuel and oil fuel.

BACKGROUND OF THE INVENTION

From the perspective of power generating cost reduction, efficient use of resources, and prevention of global warming, the examination has been made with respect to the effective use of hydrogen containing fuel which contains hydrogen, for example, coke oven gas as by-product gas generated in the ironworks, and the off-gas as by-product gas generated in the refinery. For example, employment of the hydrogen containing fuel for the gas turbine generation plant may result in low emissions of carbon dioxide ($CO_2$) in combustion, which is effective as the measure for the global warming prevention. In the case of the integrated coal gasification combined cycle (IGCC) for power generation by gasifying coal as rich natural resource, the examination has also been made with respect to the measure for reducing $CO_2$ emissions by introducing the system for capturing and storing carbon content of the hydrogen containing fuel to be supplied to the gas turbine (CCS system).

Upon use of the hydrogen containing fuel for the gas turbine fuel, failure in ignition within the combustor leads to discharge of the uncombusted hydrogen containing fuel from the combustor, causing the risk that the fuel is retained in the turbine at the downstream side. In order to avoid such risk, the startup fuel with no hydrogen content (for example, oil fuel) is used for ignition so that the gas turbine using the hydrogen containing fuel is operated until the part load reaches a predetermined value. In the predetermined part load state, the use of the fuel is switched from the startup fuel to the hydrogen containing fuel. Thereafter, the hydrogen containing fuel will raise the load up to the full load for continuing the operation. In the case of IGCC, upon start of the plant, the gas turbine is operated using the oil fuel until the coal gas is generated in the gasification furnace. After generation of the coal gasification gas, the use of the fuel for the gas turbine is switched from the oil fuel to the coal gas.

The above-described circumstance has introduced the gas turbine combustor configured to use two types of fuel, that is, the gas fuel for generally operating the gas turbine, and the oil fuel for starting and stopping the plant. The gas turbine combustor which allows combustion of both the oil fuel and the gas fuel (oil burning and gas burning) generally includes a startup burner disposed at the axial center of the combustor, and the main burner disposed around the outer circumference of the startup burner so as to allow the startup burner to conduct both oil burning and gas burning.

For example, Japanese Unexamined Patent Application Publication No. 2014-105601 discloses the method of switching the gas turbine fuel from the oil fuel to the gas fuel (from oil burning to the gas burning). Specifically, in operation of the startup burner, the oil fuel injection amount is reduced, and simultaneously, the gas fuel injection amount is increased. Thereafter, the gas fuel injection amount for the main burner is increased.

SUMMARY OF THE INVENTION

The gas turbine is configured to have the substance content of the exhaust gas from the gas turbine becomes equal to or lower than the environmental criteria. However, there may be the possible risk that a large amount of dust is generated in the exhaust gas discharged from the gas turbine upon switching of the gas turbine fuel from the oil fuel to the gas fuel. Even if the substance content of the exhaust gas is equal to or lower than the environmental criteria, it is preferable to minimize visualization of the dust contained in the exhaust gas from the gas turbine from the perspective of landscape preservation.

It is an object of the present invention to provide a gas turbine combustor and a method of operating the gas turbine combustor, which are capable of minimizing visualization of the exhaust gas from the gas turbine upon switching of the gas turbine fuel from the oil fuel to the gas fuel.

In the gas turbine combustor and the method of operating the gas turbine combustor, upon switching of a combustion by the pilot burner from the oil burning to the gas burning, a gas fuel is supplied to the main burner to start the gas burning, and then the gas fuel is supplied to the pilot burner to start the gas burning.

Upon switching of the gas turbine fuel from the oil fuel to the gas fuel, the present invention ensures to minimize visualization of the exhaust gas discharged from the gas turbine.

The above-described problem, structure and advantage will be clarified by the description of embodiments as follows.

DETAILED DESCRIPTION OF THE PREFERRED EMBODIMENTS

A first embodiment of the present invention will be described referring to the drawings.

The gas turbine combustor to which the embodiment of the present invention is applied will be described referring to FIGS. 1 to 3.

Figure 1:
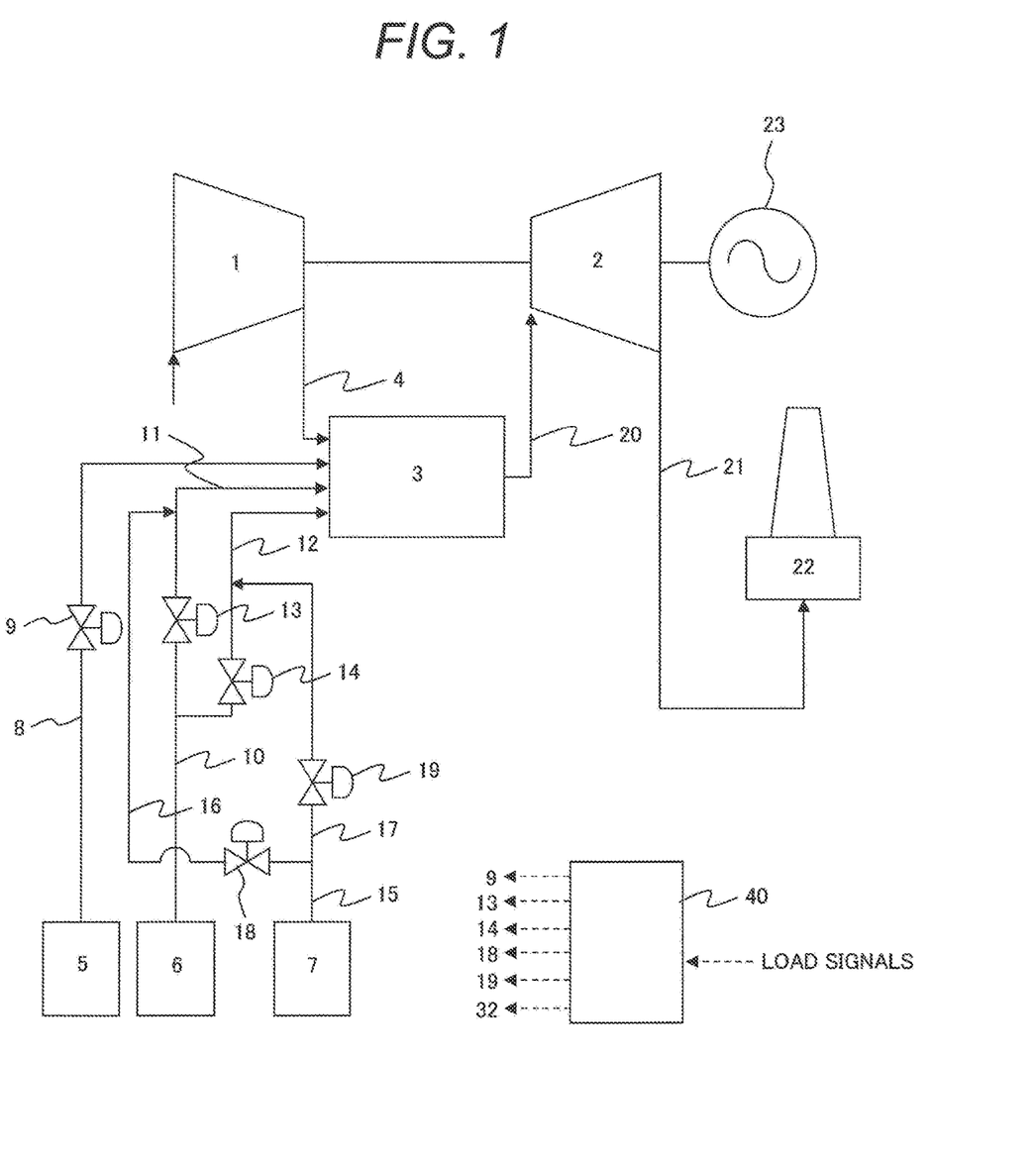
FIG. 1 is a block diagram schematically showing a structure of a gas turbine plant to which an embodiment of the present invention is applied.

FIG. 1 is a block diagram schematically showing the structure of the gas turbine plant to which the embodiment of the present invention is applied.

The gas turbine plant has main components of an air compressor 1, a combustor 3, a gas turbine 2, and a generator 23. The air compressor 1 compresses air drawn from atmosphere to generate compressed air 4 so as to be supplied to the combustor 3. In the combustor 3, the compressed air 4 and oil fuel and/or gas fuel are subjected to mixture combustion to generate combustion gas 20. The combustion gas 20 is introduced into the gas turbine 2 so as to be driven. The rotating power of the gas turbine 2 drives the generator 23 for power generation. Exhaust gas 21 from the gas turbine 2 is discharged through a funnel 22. The air compressor 1 and the gas turbine 2 are connected to a gas turbine startup motor and the like (not shown). The generator 23 is provided with a load detector (not shown) so that load signals of the gas turbine load measured by the load detector are input to a control device 40. The present invention is suitable for application to the gas turbine combustor of the gas turbine plant in the integrated coal gasification combined cycle (IGCC) plant. The drawing omits the coal gasification plant such as the coal gasification furnace, the exhaust heat recovery boiler for generating steam using the heat of exhaust gas from the gas turbine, and the steam turbine plant driven by the steam generated by the syngas cooler in the exhaust heat recovery boiler and the coal gasification plant, all of which constitute the IGCC.

Figure 2:
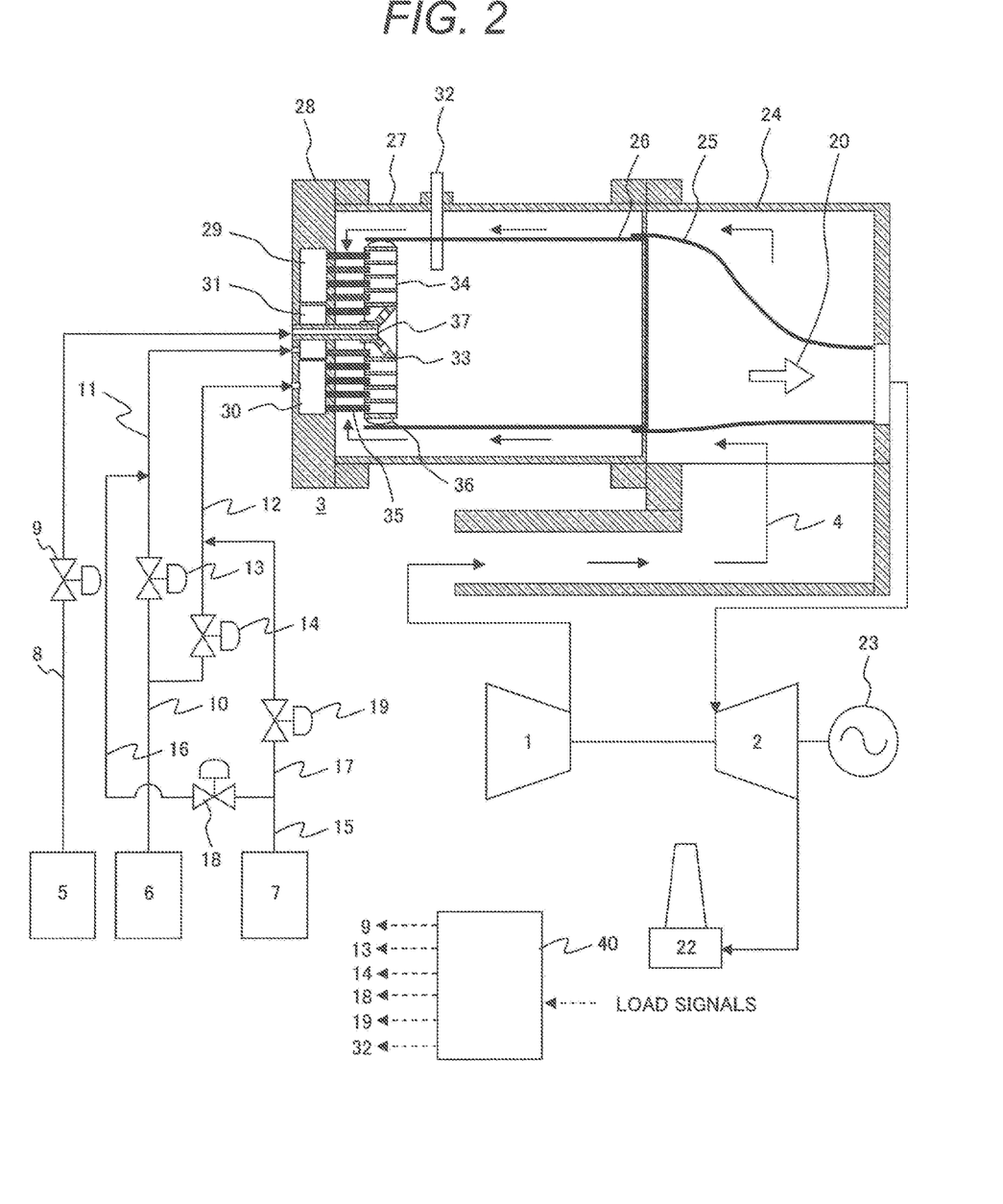
FIG. 2 is a schematic cross-sectional view showing an exemplary structure of a gas turbine combustor to which the embodiment of the present invention is applied.

FIG. 2 is a schematic cross-sectional view showing an exemplary structure of the gas turbine combustor to which the embodiment of the present invention is applied. The gas turbine combustor of this type is disclosed by United States Patent Application Publication No. US 2016/040883 A1, for example.

The gas turbine combustor 3 with a substantially cylindrical geometry includes an external cylinder 27 constituting the side surface of the structure, an end cover 28 attached to the end of the external cylinder 27, burners (pilot burner 38, main burners 39A to 39F), and an internal cylinder (combustion chamber liner) 26 having its outer surface defining the annular space with the inner surface of the external cylinder 27. The inside of the internal cylinder 26 forms a combustion chamber for combustion of the oil fuel and/or gas fuel and the compressed air 4. The combustion gas 20 generated in the combustion chamber is introduced into the gas turbine 2 through a transition piece 25.

An air hole plate 33 having a plurality of air holes 34 is disposed at the end of the internal cylinder 26 near the end cover 28. A seal member 36 is disposed between the outer circumferential surface of the air hole plate 33 and an inner surface of the internal cylinder 26. The air hole plate 33 and a plurality of gas fuel nozzles 35 constitute the pilot burner and the main burners.

The compressed air 4 from the air compressor 1 is introduced into a casing 24, and further into a passage formed between the outer circumference of the internal cylinder 26 and the inner circumference of the external cylinder 27 while passing through the space defined by the periphery of the transition piece 25 and the inner surface of the casing 24. Through holes (not shown) may be formed in the transition piece 25 and the internal cylinder 26 for cooling purpose. In the above-described case, the compressed air 4 partially flows into the transition piece and the internal cylinder 26 through the through holes. The flow direction of the compressed air 4 flowing through the passage formed between the outer circumference of the internal cylinder 26 and the inner circumference of the external cylinder 27 is converted by the end cover 28 so that the compressed air is injected into the combustion chamber while passing through the air holes 34 formed in the air hole plate 33. The air hole plate 33 is slantly depressed so that the center of the pilot burner is made distant from the combustion chamber. The above-described structure is suitable for the case of using the hydrogen containing gas fuel. The slantly depressed structure having the center of the surface at the combustion chamber side distant from the combustion chamber may reduce the angle at which the steady flame is seen from the surface of the burner center. The resultant radiation ensures to suppress heat flux flowing into the burner center, thus reducing possible risk of overheating the burner center. The air holes 34 are formed slantly so that the compressed air is injected into the combustion chamber while having the swirling component.

An oil fuel nozzle 37 that constitutes the pilot burner is disposed at the center of the end cover 28. The oil fuel from an oil fuel supply system 5 is supplied to the oil fuel nozzle 37 via an oil fuel pipe 8 and an oil fuel flow control valve 9. An opening degree of the oil fuel flow control valve 9 is controlled by the control device 40. The oil fuel pipe 8 is provided with an oil fuel shutoff valve (not shown) between the oil fuel supply system 5 and the oil fuel flow control valve 9.

Main gas manifolds 29, 30 and a pilot gas manifold 31 are formed inside the end cover 28. The gas fuel from a gas fuel supply system 6 is supplied to the main gas manifolds 29, 30 via a gas fuel pipe 10, a main burner gas fuel flow control valve 14, and a main burner gas fuel pipe 12. The gas fuel supplied to the main gas manifolds 29, 30 is injected from the plurality of gas fuel nozzles 35 into the respective air holes 34 of the air hole plate 33, which form the main burners. Those air holes 33 and the gas fuel nozzles 35 are arranged on one-to-one basis. The gas fuel from the gas fuel supply system 6 is supplied to the pilot gas manifold 31 via the gas fuel pipe 10, a pilot burner gas fuel flow control valve 13, and a pilot burner gas fuel pipe 11. The gas fuel supplied to the pilot gas manifold 31 is injected from the gas fuel nozzles 35 into the respective air holes 34 of the air hole plate 33, which form the pilot burner. A coaxial jet flow burner is formed by coaxially arranging the gas fuel nozzles 35 and the air holes 34. The main burner is formed through arrangement of many coaxial jet flow burners. The pilot burner is formed by integrating the structure derived from arranging many coaxial jet flow burners with the oil fuel injection nozzle. Aiming at low NOx combustion and flashback prevention, the structure derived from arranging many coaxial jet flow burners serves to preliminarily enhance dispersibility of the fuel and air so as to be supplied to the combustion chamber, and mix the fuel and air through the short path. Each opening degree of the pilot burner gas fuel flow control valve 13 and the main burner gas fuel flow control valve 14 is controlled by the control device 40. The gas fuel pipe 10 is branched into the pilot burner gas fuel pipe 11 and the main burner gas fuel pipe 12. The gas fuel pipe 10 is provided with the gas fuel shutoff valve (not shown) between the gas fuel supply system 6 and a branch point. In the case of the IGCC plant, the gas fuel supply system 6 supplies coal gasification gas from the coal gasification plant.

Nitrogen gas is further supplied to the main gas manifolds 29, 30 from a nitrogen supply system 7 via a nitrogen supply pipe 15, a main burner nitrogen supply pipe 17, a main burner nitrogen flow control valve 19, and the main burner gas fuel pipe 12. Nitrogen gas is supplied to the pilot gas manifold 31 from the nitrogen supply system 7 via the nitrogen supply pipe 15, a pilot burner nitrogen supply pipe 16, a pilot burner nitrogen flow control valve 18 and the pilot burner gas fuel pipe 11. Each opening degree of the pilot burner nitrogen flow control valve 18 and the main burner nitrogen flow control valve 19 is controlled by the control device 40. The nitrogen supply pipe 15 is branched into the pilot burner nitrogen supply pipe 16 and the main burner nitrogen supply pipe 17. The pilot burner nitrogen supply pipe 16 joins the pilot burner gas fuel pipe 11 at the downstream side of the pilot burner gas fuel flow control valve 13. The main burner nitrogen supply pipe 17 joins the main burner gas fuel pipe 12 at the downstream side of the main burner gas fuel flow control valve 14. The nitrogen supply pipe 15 is provided with a nitrogen shutoff valve (not shown) between the nitrogen supply system 7 and the branch point. Before starting combustion by the main burners and the pilot burner, that is, before supplying the gas fuel to the gas fuel nozzles 35, the nitrogen gas is supplied from the nitrogen supply system for purification (replacement by nitrogen gas) of the fuel gas supply system including the main gas manifolds 29, 30, the pilot gas manifold 31, and the fuel injection nozzles 35 through nitrogen gas purge.

An ignitor plug 32 is fitted with the external cylinder 27 while piercing through the internal cylinder 26 for positioning an ignition point in the combustion chamber at the side of the air hole plate 33. Spark operations of the ignitor plug 32 are controlled by the control device 40.

Figure 3:
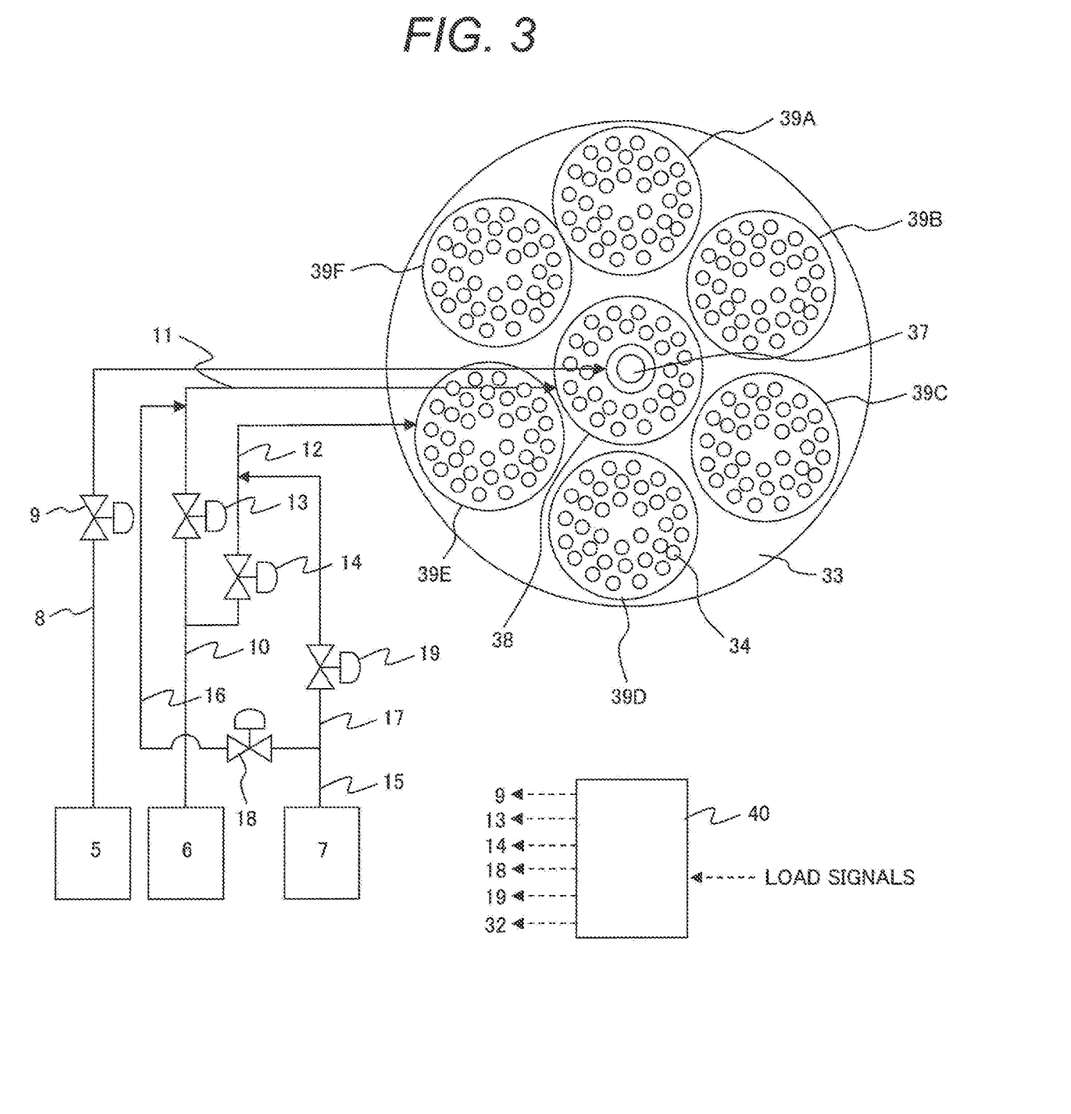
FIG. 3 is a front view of a burner seen from a combustion chamber, showing an exemplary structure of the gas turbine combustor to which the embodiment of the present invention is applied.

FIG. 3 is a front view of the burner seen from the combustion chamber, showing an exemplary structure of the gas turbine combustor to which the embodiment of the present invention is applied. As shown in FIG. 3, the combustor burner includes the pilot burner 38 and a plurality of main burners 39A to 39F (six main burners shown in FIG. 3) arranged around the outer circumference of the pilot burner 38. The oil fuel nozzle 37 is disposed at the center (axial center of the combustor) of the pilot burner 38 located in the center. The main burners 39A to 39F are arranged around the pilot burner 38. The air hole plate 33 has the air holes formed coaxially with each axial center of the pilot burner 38 and the main burners 39A to 39F.

The explanation will be made with respect to the fuel switching operation in the process for operating the gas turbine combustor according to the embodiment of the present invention.

Figure 4:
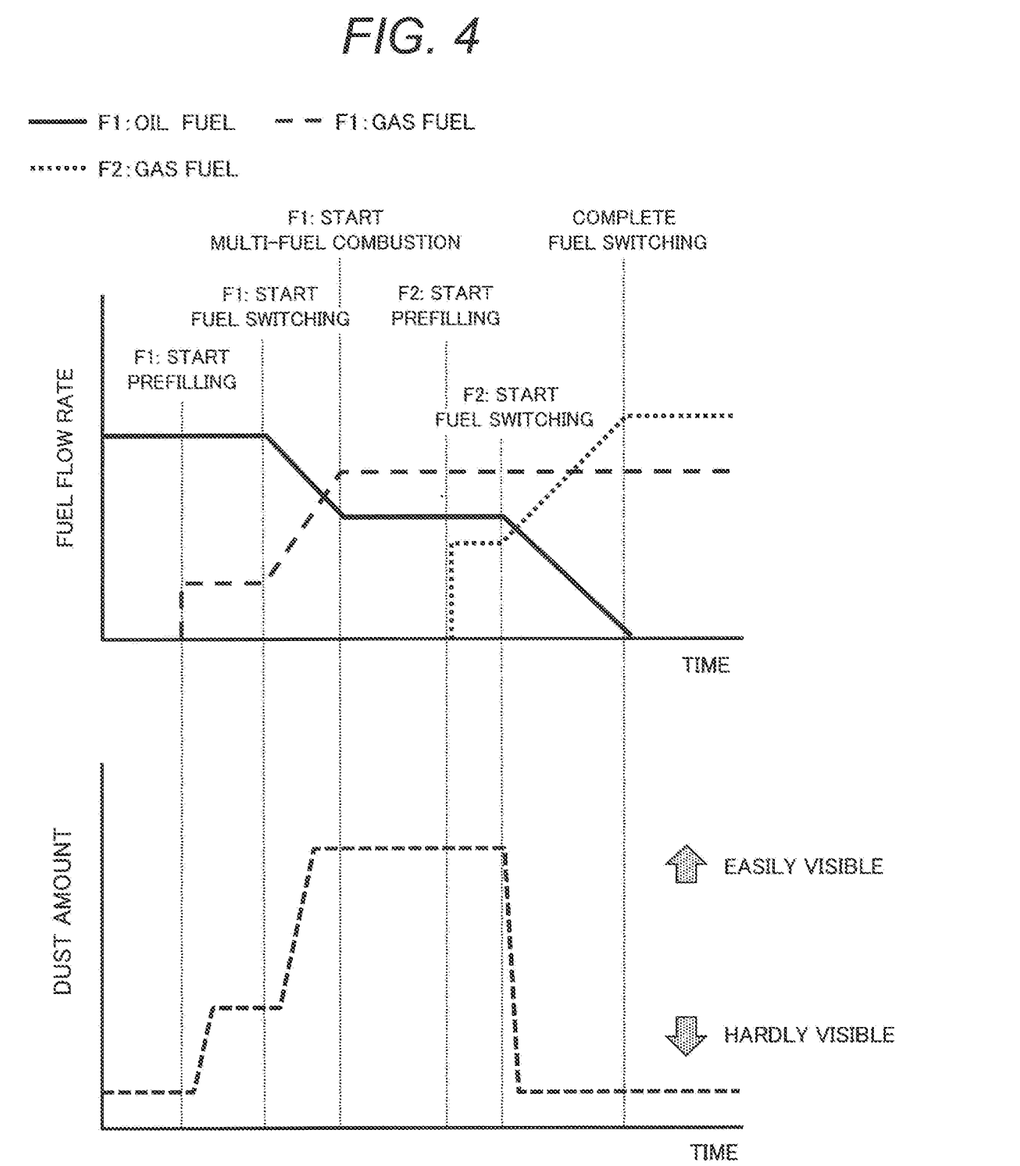
FIG. 4 is a view showing a relationship between a fuel switching logic and a dust amount in the process for operating the gas turbine combustor as a comparative example.

Firstly, the explanation will be made with respect to the fuel switching operation in the process for operating the gas turbine combustor as a comparative example. FIG. 4 shows a relationship between the fuel switching logic and the amount of generated dust in the comparative example. The pilot burner will be referred to as an F1 burner, and the main burner will be referred to as an F2 burner.

The gas turbine combustor employed in the IGCC plant is configured to inject the oil fuel from the oil fuel nozzle 37 of the F1 burner for ignition by the ignitor plug 32. The combustion gas is generated by the gas turbine combustor for activating the gas turbine. At this time point, the pilot burner gas fuel flow control valve 13, the main burner gas fuel flow control valve 14, the pilot burner nitrogen flow control valve 18, and the main burner nitrogen flow control valve 19 are all closed. Subsequent to the predetermined combustion, the fuel for the gas turbine combustor is switched from the oil fuel to the gas fuel. The fuel switching is conducted in the part load state. The pilot burner nitrogen flow control valve 18 and the main burner nitrogen flow control valve 19 are opened each at a predetermined opening degree so as to conduct the nitrogen gas purge for a predetermined time period. Thereafter, the pilot burner nitrogen flow control valve 18 and the main burner nitrogen flow control valve 19 are closed. In the comparative example, the pilot burner gas fuel flow control valve 13 is opened at the opening degree corresponding to the flow rate of the fuel at which the coaxial jet flow burner of the F1 burner (pilot burner 38) is not ignited. Then the gas fuel supply system of the F1 burner (including the pilot burner gas fuel flow control valve 13, the pilot burner gas fuel pipe 11, the pilot gas manifold 31, and the gas fuel nozzle 35) is filled with the gas fuel (F1 prefilling). The time period for the F1 prefilling is determined by the gas fuel supply system volume.

After finishing the F1 prefilling, the oil fuel flow control valve 9 is gradually closed to steadily reduce the oil fuel for the F1 burner. Simultaneously, the pilot burner gas fuel flow control valve 13 is gradually opened to steadily increase the gas fuel for the F1 burner (F1: start fuel switching). In the fuel switching process, the coaxial jet flow burner of the F1 burner is ignited to generate F1 gas flame. The oil fuel is reduced to the predetermined flow rate, and the gas fuel for the F1 burner is increased to the predetermined flow rate (for example, fully opened, or half opened). Then multi-fuel combustion is conducted by the F1 burner for a predetermined time period. Thereafter, the main burner nitrogen flow control valve 19 is opened at a predetermined opening degree before starting F2 prefilling so that the F2 burner is subjected to the nitrogen gas purge again for the predetermined time period. The main burner nitrogen flow control valve 19 is closed, and the main burner gas fuel flow control valve 14 is opened at the opening degree corresponding to the flow rate of the fuel at which the F2 burner is not ignited. The gas fuel supply system of the F2 burner (including the main burner gas fuel flow control valve 14, the main burner gas fuel pipe 12, the main gas manifolds 29, 30, and the gas fuel nozzle 35) is filled with the gas fuel (F2 prefilling). The time period for the F2 prefilling is determined by the gas fuel supply system volume. After finishing the F2 prefilling, the oil fuel flow control valve 9 is gradually closed again to steadily reduce the oil fuel for the F1 burner again. Simultaneously, the main burner gas fuel flow control valve 14 is gradually opened to steadily increase the gas fuel for the F2 burner (F2: start fuel switching). As for the F1 burner, in the case that the flow rate of the gas fuel is set to the predetermined value at the time point of the F1 multi-fuel combustion, the opening degree of the pilot burner gas fuel flow control valve 13 is maintained. In the case that the flow rate is set to the value in the half-opened state, the pilot burner gas fuel flow control valve 13 is gradually opened again to increase the gas fuel for the F1 burner as well as increase in the gas fuel for the F2 burner. In the F2 fuel switching process, the F2 burner is ignited to generate F2 gas flame. At the time point when the oil fuel flow control valve 9 is fully closed and the main burner gas fuel flow control valve 14 reaches the predetermined opening degree, the fuel switching is completed.

Upon fuel switching from the oil fuel to the gas fuel in accordance with the above-mentioned fuel switching logic, the dust density in the exhaust gas becomes high enough to visualize the exhaust gas. As shown in FIG. 4, in the time period from start of the F1 fuel switching (after igniting the coaxial jet flow burner of the F1 burner) to the start of the F2 fuel switching (until the F2 burner is ignited), in other words, in the time period for which the gas is burned in addition to the oil burning in the F1 burner (multi-fuel combustion phase of the F1 burner), the dust amount becomes large enough to visualize the exhaust gas (colored smoke).

As a result of examination of the inventors, it is considered that the comparative example results in the phenomenon as described below in the fuel switching time period (from "F1: start fuel switching" to "F2: start fuel switching" in FIG. 4).

The gas fuel is more likely to be flammable than the oil fuel. Therefore, more oxygen is consumed in the gas fuel combustion, thus causing the state where sufficient oxygen cannot be supplied to the oil fuel. As oxidation reaction in the oil combustion is not accelerated, the amount of generated dust is considered to be increased.

Figure 5:
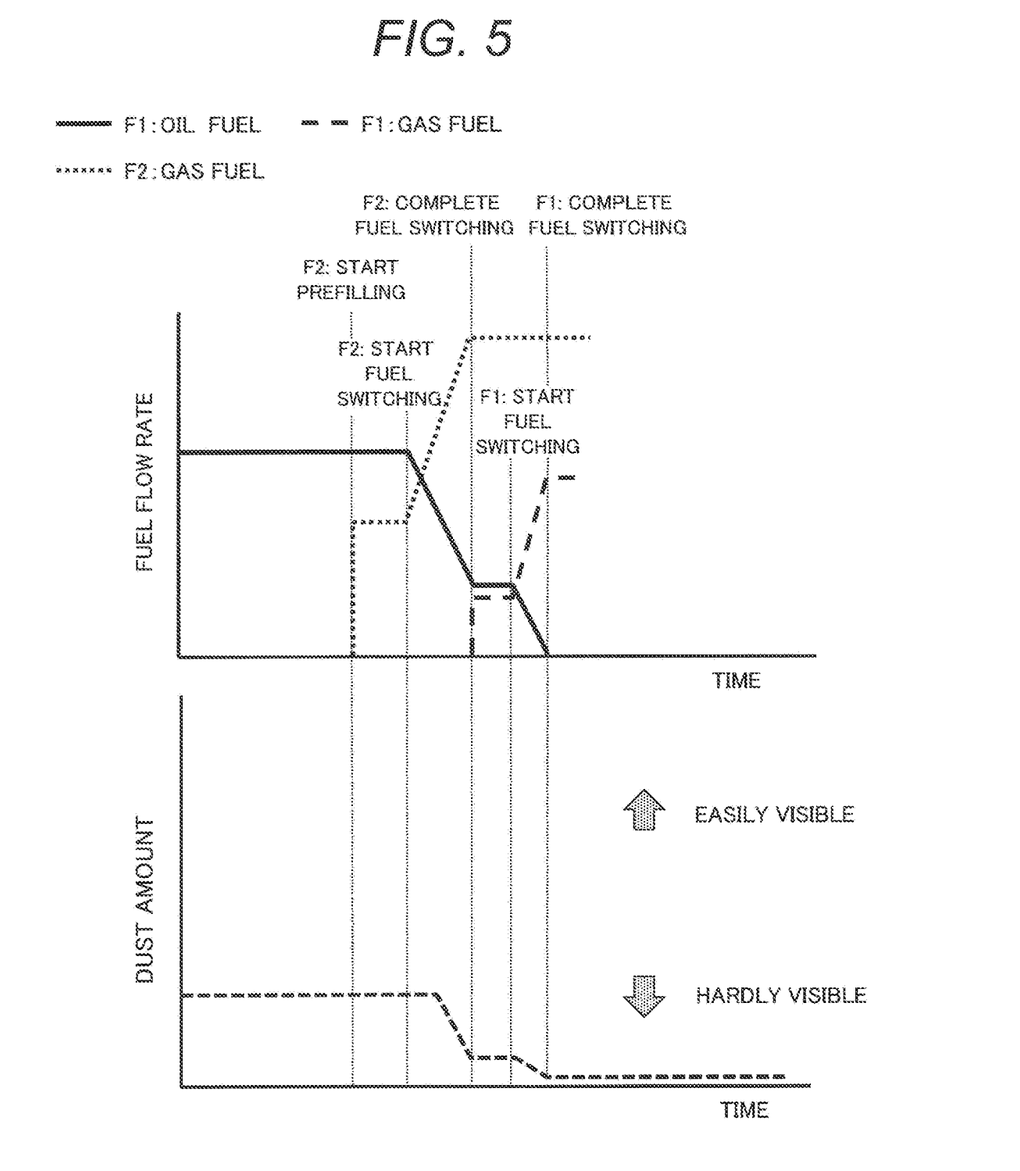
FIG. 5 is a view showing a relationship between a fuel switching logic and a dust amount in the process for operating the gas turbine combustor according to the embodiment of the present invention.

An explanation will be made with respect to the fuel switching in the process for operating the gas turbine combustor according to the embodiment of the present invention. FIG. 5 is a view showing a relationship between the fuel switching logic and the amount of generated dust in the method of operating the gas turbine combustor according to the embodiment of the present invention.

In this embodiment, upon switching of combustion from the oil burning to the gas burning by the pilot burner (F1 burner) 38, the gas fuel is supplied to the main burner (F2 burner) 39 to start the gas burning. Thereafter, the gas fuel is supplied to the pilot burner to start the gas burning.

Likewise the comparative example, the oil fuel is injected from the oil fuel nozzle 37 of the F1 burner to allow the ignitor plug 32 to perform ignition. The combustion gas is generated by the gas turbine combustor to start up the gas turbine. At this time, the pilot burner gas fuel flow control valve 13, the main burner gas fuel flow control valve 14, the pilot burner nitrogen flow control valve 18, and the main burner nitrogen flow control valve 19 are all closed. Subsequent to the predetermined combustion, the fuel for the gas turbine combustor is switched from the oil fuel to the gas fuel. The fuel is switched in the part load state.

Each of the pilot burner nitrogen flow control valve 18 and the main burner nitrogen flow control valve 19 is opened at the predetermined opening degree so that the nitrogen gas purge is performed for a predetermined period of time. Then the main burner nitrogen flow control valve 19 is closed, and the main burner gas fuel flow control valve 13 is opened at the opening degree corresponding to the fuel flow rate at which the F2 burner is not ignited. The gas fuel supply system of the F2 burner (including the main burner gas fuel flow control valve 14, the main burner gas fuel pipe 12, the main gas manifolds 29, 30, and the gas fuel nozzle 35) is filled with the gas fuel (F2 prefilling). The time period for the F2 prefilling is determined by the gas fuel supply system volume. After finishing the F2 prefilling, the oil fuel flow control valve 9 is gradually closed to steadily reduce the oil fuel for the F1 burner. Simultaneously, the main burner gas fuel flow control valve 14 is gradually opened to steadily increase the gas fuel for F2 burner (F2: start fuel switching). At this time, the gas fuel is not supplied to the F1 burner (pilot burner gas fuel flow control valve 13 is fully closed). In the F2 fuel switching process, the F2 burner is ignited to generate the F2 gas flame.

In the F2 prefilling process and the F2 fuel switching process, the pilot burner nitrogen flow control valve 18 may be kept either opened or closed.

In the case of large generation amount of dust during oil burning by the F1 burner, opening of the pilot burner nitrogen flow control valve 18 may be effective for reducing the dust generation amount. In the F2 prefilling process, it is preferable to keep the pilot burner nitrogen flow control valve 18 opened from the perspective of effective for preventing the F2 burner from being ignited. In the F2 fuel switching process, it is preferable to close the pilot burner nitrogen flow control valve 18 from the perspective of facilitating ignition of the F2 burner. However, it is not limited to the above-described measures.

The oil fuel is reduced to the predetermined flow rate, and the gas fuel for the F2 burner is increased to the predetermined flow rate (for example, full-open flow rate) (completion of the F2 fuel switching). Then the multi-fuel combustion including the oil burning by the F1 burner and the gas burning by the F2 burner is performed for a predetermined time period. The time period for the multi-fuel combustion is set to be shorter than the time period for the F1 multi-fuel combustion by the F1 burner according to the comparative example (In the comparative example, the time period is set to approximately 100 seconds. In the embodiment according to the present invention, the time period is set to approximately over ten seconds.). Because of short time period, FIG. 5 omits the multi-fuel combustion after completion of the F2 fuel switching. It is also possible to start the F1 prefilling (described later) immediately after completion of the fuel switching without performing the multi-fuel combustion. Upon multi-fuel combustion, the pilot burner nitrogen flow control valve 18 may be either opened or closed. Keeping the pilot burner nitrogen flow control valve 18 opened until the start of the F1 prefilling secures to further suppress dust generation as described later in detail.

Then the F1 prefilling is performed. If the pilot burner nitrogen flow control valve 18 is closed during the multi-fuel combustion as described above, it is preferable to perform the nitrogen gas purge prior to the F1 prefilling. The pilot burner gas fuel flow control valve 13 is opened at the opening degree corresponding to the fuel flow rate at which the coaxial jet flow burner of the F1 burner (pilot burner 38) is not ignited. The gas fuel supply system of the F1 burner (including the pilot burner gas fuel flow control valve 13, the pilot burner gas fuel pipe 11, the pilot gas manifold 31, and the gas fuel nozzle 35) is filled with the gas fuel (F1 prefilling). The time period for the F1 prefilling is determined by the gas fuel supply system volume.

After finishing the F1 prefilling, the oil fuel flow control valve 9 is gradually closed again to steadily reduce the oil fuel for the F1 burner. Simultaneously, the pilot burner gas fuel flow control valve 13 is gradually opened to steadily increase the gas fuel for the F1 burner (F1: start fuel switching). In the fuel switching process, the coaxial jet flow burner of the F1 burner is ignited to generate the F1 gas flame. At the time point when the oil fuel flow control valve 9 is fully closed, and the pilot burner gas fuel flow control valve 13 is opened at the predetermined opening degree (fully opened, for example), the fuel switching is completed (completion of the F1 fuel switching).

The fuel switching from the oil fuel to the gas fuel in accordance with the fuel switching logic according to the embodiment of the present invention suppresses generation amount of the dust in the exhaust gas, thus lessening visualization of the exhaust gas. In other words, as shown in FIG. 5, starting the gas burning by the F2 burner before switching the fuel for the F1 burner may suppress generation amount of the dust even in the multi-fuel combustion.

The F2 fuel switching performed before the F1 fuel switching makes it possible to accelerate oxidation of the oil fuel by the F2 flame in the F2 burner, resulting in reduced dust emissions. Starting the multi-fuel combustion by the F1 burner subsequent to the F2 fuel switching also makes it possible to accelerate oxidation of the oil fuel by the F2 flame because of simultaneously supplied F2 fuel gas. Upon F1 fuel switching, the flow rate of the oil fuel has been reduced in the F2 fuel switching process, thus suppressing the dust generation amount owing to the F1 multi-fuel combustion.

As described above, in the embodiment, the F1 fuel switching is performed subsequent to the F2 fuel switching. In the F2 fuel switching, the F1 fuel gas is not supplied. Therefore, in the F2 fuel switching, the nitrogen gas may be supplied to the coaxial jet flow burner of the F1 burner (pilot burner 38) as described above. In the case of multi-fuel combustion where the oil burning by the F1 burner and the gas burning by the F2 burner are performed, supply of the nitrogen gas to the coaxial jet flow burner of the F1 burner (pilot burner 38) will lift the oil flame from the oil drop. The vaporized fuel and air from the main burner are mixed to lower the local flame temperature. This makes it possible to suppress generation of the dust.

Figure 6:
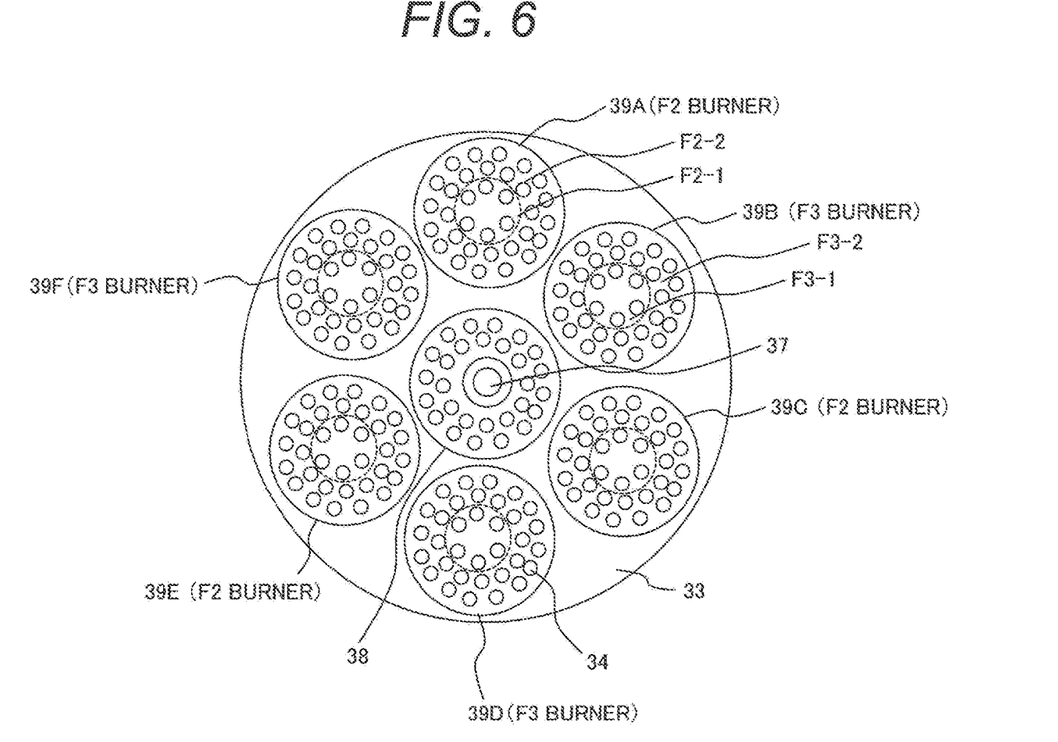
FIG. 6 is a front view of the burner seen from the combustion chamber, showing an exemplary structure of the gas turbine combustor to which an embodiment of the present invention is applied.

A second embodiment of the present invention will be described referring to FIG. 6. FIG. 6 is a front view of the burner as described in the first embodiment. The respective structures of the oil fuel nozzle 37, the pilot burner 38, and the main burners 39A to 39F are the same as those described in the first embodiment. In the second embodiment, each of the main burners 39 has a plurality of fuel systems.

The combustor according to the embodiment supplies the fuel to the pilot burner and the main burner in the operation state of the gas turbine. In order to actualize both low NOx and stable combustion, it is preferable to configure the main burner to be divided into a plurality of groups so that the gas fuel is injected in accordance with the load. For example, as shown in FIG. 6, the main burners are divided into the group (F2 burner) including the main burners 39A, 39C, 39E, and the group (F3 burner) including the main burners 39B, 39D, 39F. The pilot burner will be referred to as F1 burner corresponding to the F2 burners and the F3 burners. In the case of the part load, combustion is performed by the F1 burner or F1 burner and F2 burner. In the case that the main burners are divided into the F2 burner group and the F3 burner group, the main gas manifolds will also be divided into those for the groups of F2 and F3. The gas fuel supply system will also be divided into a plurality of groups correspondingly. It is also possible that each group of the F2 burners and the F3 burners is divided into the F2-1 burner and the F3-1 burner at the center side, and F2-2 burner and the F3-2 burner at the outer circumferential side for stable combustion in accordance with the load. In the aforementioned case, each of the main manifold and the gas fuel supply system will be divided correspondingly. In this embodiment, the combustor burner includes the F1 burner, the F2-1 burner, the F2-2 burner, the F3-1 burner, and the F3-2 burner. The F1 burner is allowed to perform both oil burning and gas burning.

In the first embodiment, the F2 burner is activated for combustion before switching the F1 burner operation from the oil burning to the gas burning so as to suppress amount of dust generated by the F1 burner. The second embodiment allows selection of the F2 burner according to the first embodiment from those of F2-1, F3-1, F2-2, and F3-2. Depending on the load of the gas turbine to be switched, it is possible to select the F2-1 and F3-1 as the F2 burner. The burners F2-1, F3-1 are located at the center of the main burner to effectuate the combustion mode such as diffusion combustion, thus securing the stable combustion state upon switching to the F2 burner from the oil burning.

The present invention is not limited to the first embodiment and the second embodiment as described above, but includes various modifications. For example, the embodiments are described in detail for readily understanding of the present invention which is not necessarily limited to the one equipped with all structures as described above. It is possible to replace a part of the structure of one embodiment with the structure of another embodiment. The one embodiment may be provided with an additional structure of another embodiment. It is further possible to add, remove, and replace the other structure to, from and with a part of the structure of the respective embodiments.

For example, in addition to the IGCC as described above, the gas turbine combustor according to the present invention is applicable to the gas turbine using coke oven gas (COG) which contains hydrogen as by-product gas, blast furnace gas (BFG), LD converter gas (LDG: Linzer Donawitz Gas), or the gas as mixture thereof from iron manufacturing plant, and the gas turbine using the by-product product gas that contains hydrogen as the fuel, which is derived from naphtha cracking plant in the refinery.

The present invention is also applicable to the gas turbine combustor (for example, as disclosed in U.S. Pat. No. 5,899,074), which includes the pilot burner with the fuel injection nozzle disposed in the center for diffusion combustion, and the main burner with the annular premixing nozzle disposed at the outer circumference for injecting the mixture of fuel and air. In the above case, the pilot burner is configured to have the oil fuel injection nozzle and the gas fuel injection nozzle so as to allow both the oil burning and the gas burning.

In the above-described embodiments, the main burner serves as the one for gas burning. However, the main burner may be configured to perform both oil burning and gas burning. In the circumstance that the gas fuel cannot be used, the main burner configured to allow combustion of the oil fuel secures flexibility in management of the turbine plant. In this case, the gas burning is performed by the main burner upon switching of the fuel from the oil burning to the gas burning by the pilot burner.

In the above-described embodiments, nitrogen gas purge is performed. However, it is possible to perform the purge using other inert gas.

LIST OF REFERENCE SIGNS

1 . . . compressor, 2 . . . gas turbine, 3 . . . combustor, 4 . . . compressed air, 5 . . . oil fuel supply system, 6 . . . gas fuel supply system, 7 . . . nitrogen supply system, 8 . . . oil fuel pipe, 9 . . . oil fuel flow control valve, 10 . . . gas fuel pipe, 11 . . . pilot burner gas fuel pipe, 12 . . . main burner gas fuel pipe, 13 . . . pilot burner gas fuel flow control valve, 14 . . . main burner gas fuel flow control valve, 15 . . . nitrogen supply pipe, 16 . . . pilot burner nitrogen supply pipe, 17 . . . main burner nitrogen supply pipe, 18 . . . pilot burner nitrogen flow control valve, 19 . . . main burner nitrogen flow control valve, 20 . . . combustion gas, 21 . . . exhaust gas, 22 . . . funnel, 23 . . . generator, 24 . . . casing, 25 . . . transition piece, 26 . . . internal cylinder, 27 . . . external cylinder, 28 . . . end cover, 29 . . . main gas manifold, 30 . . . main gas manifold, 31 . . . pilot gas manifold, 32 . . . ignitor plug, 33 . . . air hole plate, 34 . . . air hole, 35 . . . gas fuel nozzle, 36 . . . seal member, 37 . . . oil fuel nozzle, 38 . . . pilot burner, 39A-39F . . . main burner, and 40 . . . control device.

What is claimed is:

1. A method of operating a gas turbine combustor which includes a pilot burner and a main burner arranged around an outer circumference of the pilot burner, the pilot burner being configured to be capable of performing an oil burning operation and a gas burning operation, and the main burner being configured to be capable of performing at least the gas burning operation,     wherein upon switching of a combustion by the pilot burner from the oil burning operation to the gas burning operation, a gas fuel is supplied to the main burner to start the gas burning operation, and subsequent to starting the gas burning operation in the main burner the gas fuel is supplied to the pilot burner to start the gas burning operation in the pilot burner.

2. The method of operating a gas turbine combustor according to claim 1, wherein in a process of the gas burning operation in which the gas fuel is supplied to the main burner to perform the gas burning operation, inert gas is supplied to a gas burner of the pilot burner.

3. A gas turbine combustor which includes a pilot burner and a main burner arranged around an outer circumference of the pilot burner, the pilot burner being configured to be capable of performing an oil burning operation and a gas burning operation, and the main burner being configured to be capable of performing at least the gas burning operation, the gas turbine combustor comprising:

an oil fuel supply system configured to supply an oil fuel to an oil fuel nozzle of the pilot burner and provided with an oil fuel flow control valve;

a pilot burner gas fuel supply system configured to supply a gas fuel to a gas fuel nozzle of the pilot burner and provided with a pilot burner gas fuel flow control valve;

a main burner gas fuel supply system configured to supply the gas fuel to a gas fuel nozzle of the main burner and provided with a main burner gas fuel flow control valve; and     a control device which is configured to send out a control instruction for controlling each opening degree of the oil fuel flow control valve, the pilot burner gas fuel flow control valve, and the main burner gas fuel flow control valve,     wherein upon switching of a combustion by the pilot burner from the oil burning operation to the gas burning operation, the control device is configured to send out instructions to gradually close the oil fuel flow control valve by reducing the opening degree and to gradually open the main burner gas fuel flow control valve by increasing the opening degree, and is configured to, subsequent to sending out the instructions to the oil fuel flow control valve and the main burner gas fuel flow control valve, send out instructions to gradually open the pilot burner gas fuel flow control valve while keeping the main burner gas fuel flow control valve opened, and to fully close the oil fuel flow control valve.

4. The gas turbine combustor according to claim 3, further comprising an inert gas supply system configured to supply inert gas to the gas fuel nozzle of the pilot burner and provided with an inert gas flow control valve,     wherein the control device is further configured to send out an instruction to open the inert gas flow control valve at a timing before opening of the pilot burner gas fuel flow control valve subsequent to generation of a flame by the main burner through opening of the main burner gas fuel flow control valve.

\* \* \* \* \*